United States Patent [19]

Hougham

[11] Patent Number: 5,316,778
[45] Date of Patent: May 31, 1994

[54] METHOD FOR PROCESSING LEAFY VEGETABLES FOR EXTENDED STORAGE

[75] Inventor: John K. Hougham, Carmel, Calif.

[73] Assignee: Global Prepcorp, Salinas, Calif.

[21] Appl. No.: 800,494

[22] Filed: Nov. 29, 1991

[51] Int. Cl.⁵ ............................................. A23L 1/025
[52] U.S. Cl. ................................... 426/324; 426/321; 426/326; 426/518; 426/615
[58] Field of Search ............... 426/321, 324, 326, 615, 426/518

[56] References Cited

U.S. PATENT DOCUMENTS

| | | | |
|---|---|---|---|
| 2,531,463 | 11/1950 | Pryor et al. | 426/318 |
| 2,698,804 | 1/1950 | Crisafull et al. | 426/324 |
| 3,450,542 | 6/1969 | Badran | 426/108 |
| 3,795,749 | 3/1974 | Cummin et al. | 426/326 |
| 3,814,820 | 6/1974 | Busta et al. | 426/262 |
| 3,849,581 | 11/1974 | Kubu | 426/541 |
| 3,987,208 | 10/1976 | Rahman et al. | 426/326 |
| 4,001,443 | 1/1977 | Dave | 426/106 |
| 4,168,597 | 9/1979 | Cayton | 426/419 |
| 4,711,789 | 12/1987 | Orr et al. | 426/326 |
| 4,753,808 | 6/1988 | Orr et al. | 426/106 |
| 4,810,512 | 3/1989 | Kratky et al. | 426/270 |
| 4,883,674 | 11/1989 | Fan | 426/118 |
| 4,943,440 | 7/1990 | Armstrong | 426/118 |
| 4,959,230 | 9/1990 | Wyss et al. | 426/102 |
| 4,961,945 | 10/1990 | Pearson | 426/269 |
| 4,988,523 | 1/1991 | Gardner et al. | 426/268 |

OTHER PUBLICATIONS

Ziemann et al. The White House Cook Book, The Saalfield Publishing Co., 1929, p. 197.
Givens, 1949, Modern Encyclopedia of Cooking, vol. II, J. G. Ferguson and Associates, Chicago, Ill., pp. 1226, 1229.
Lach, A., 1974, How's and Why's of French Cooking, The University of Chicago Press, London p. 409.

*Primary Examiner*—Helen Pratt
*Attorney, Agent, or Firm*—John S. Ferrell

[57] ABSTRACT

A method for processing common varieties of leafy vegetables to extend its storage life. The leafy vegetables are selected, cut, trimmed and conveyed to a processing area. During processing, the leafy vegetable leaves are torn rather than cut from the vegetable stems. Once cored, the leafy vegetables are washed in chlorinated water, dried and then chilled prior to final distribution.

20 Claims, 1 Drawing Sheet

METHOD FOR PROCESSING LEAFY VEGETABLES FOR EXTENDED STORAGE

BACKGROUND OF THE INVENTION

1. Field of the Invention

This invention relates to the processing of leafy vegetables and more particularly to a method for the processing of leafy vegetables to produce an extended storage life.

2. Description of the Background Art

The expanded food service industry and consumer demand for prepared food product has had a significant impact on the fresh fruit and vegetable trade. For example, the prepared lettuce business for chopped, shredded and cored product now exceeds one billion pounds of pre-cut lettuce per year. Exacerbating the problem of meeting this huge demand for leafy vegetables is the fact that significant production yield decays or spoils before reaching the dinner table of the consumer. Part of this spoilage results from distribution difficulties which result from loading, transport and storage. Even routine shipping can cause extensive spoilage and economic loss with these short shelf-life products.

Spoilage of leafy vegetables occurs as a result of a variety of processes including microbiological decay, handling damage, and loss of cellular integrity with a consequential dissipation of cellular fluids. What is needed is a method of processing and treating leafy vegetables to mitigate spoilage.

SUMMARY OF THE INVENTION

In accordance with the present invention, a method is described which extends the storage life of processed fresh leafy vegetables. The method involves the selection, cutting, and trimming of leafy vegetables, using a tearing process to separate whole leaves from the stem. The removal of the leaves along intercellular boundaries limits cellular destruction of leaf tissue and thereby promotes an extended storage life. Once the leaf product is sorted, the vegetable leaves are sprayed with a water chlorine solution and refrigerated. After chilling, the leaves are washed using an overhead spray, a submergence bath and an agitation bath before drying, packaging, and final cooling.

DESCRIPTION OF THE PREFERRED EMBODIMENT

Figure 1:
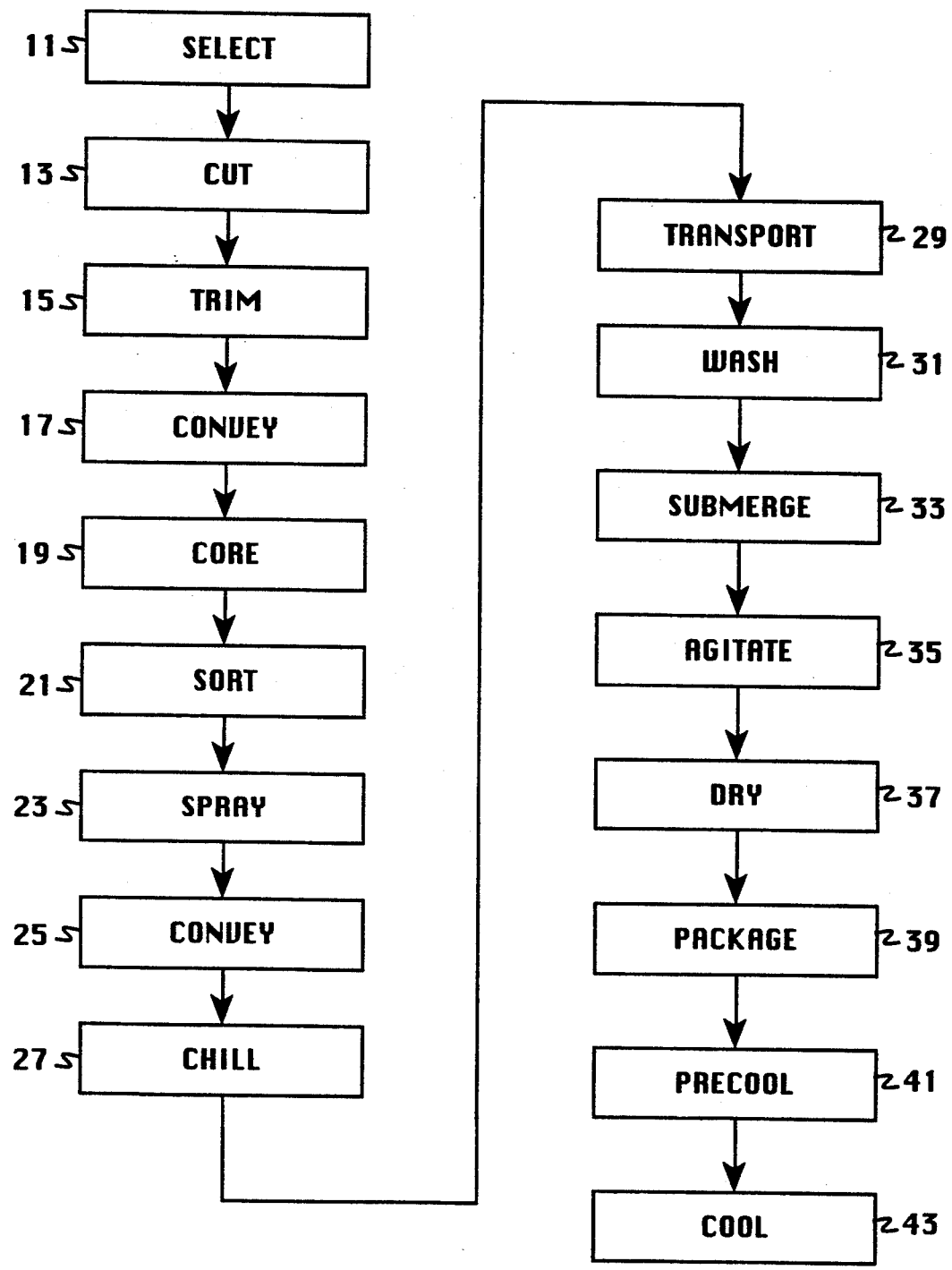
FIG. 1 is a flow diagram of the vegetable processing method disclosed in the present invention.

Referring now to FIG. 1, a flow diagram is shown outlining the steps of the processing method of the present invention. In step 11, the grower selects the product to be cut. The fields to which this process are primarily directed include first cut and re-cut harvests of leafy vegetables such as red, green, romaine and Boston (butter) and other leafy varieties. In steps 13 and 15 respectively, harvesting crews cut and trim the vegetable and place the product on a conveyer belt to be conveyed to a processing belt in step 17. Raw product is then handled or cored in step 19, wherein the leaves are torn from the vegetable stem.

The tearing of the leaves as opposed to cutting, is important to maintaining extended product freshness. As stated above, cutting vegetables generally results in significant cellular damage which in turn results in loss of cell fluids, and introduces the significant risk of rapid microbiological decay. By tearing the leaves, the cells are separated along interstitial boundaries rather than individually dissected. Furthermore, tearing the leaves from the stem may also result in the inclusion of residual stem tissue. This residual core tissue on the torn leaf is believed to further promote extended shelf life. As used in this specification, peeling is included as a method of tearing, since in order to peel a leaf, the leaf must be ultimately torn from the stem.

In step 21, sorting crews place the cored product from step 19 into coded baskets according to leaf size, quality or other discriminating features. For instance, the leaves from the heart of the plant are often segregated for separate processing designed for salad products. The lettuce leaves are then sprayed in step 23 with a solution of fresh water and chlorine consisting of approximately 100 parts per million of chlorine to water. Chlorine solutions ranging from 10 to 1000 parts per million can be used for this wash. This chlorine solution will remove any natural latex milky substance generated from the leaf. This wash will also add moisture to the leaf which adds to the shelf life of the vegetable. This first wash also tends to have an antimicrobial effect by creating a chemically hostile environment to bacteria and various fungal spores. In addition this first wash removes some of the dirt and debris which has accumulated on the product due to field handling.

In step 25, the full baskets are conveyed to an enclosed refrigerated van, which accompanies the harvesting machinery in the field. Refrigerated van temperatures are maintained at 32 to 52 degrees F. The baskets are palletized within the van and untimately moved to a processing facility in step 29. Upon arrival at the processing facility, the palletized baskets are placed on a conveyer belt and transported through an overhead wash system in step 31. Equivalently, the baskets may be submerged in a water bath in step 33 and agitated in step 35. This submersion and agitation act to remove insects, dirt and other debris which remains attached to the product following field processing. Both the overhead wash of step 31 and the submersion of step 33 utilize the chlorine water solution described above. Following the washing cycle, the leaves are dried in step 37. Drying can occur by methods of agitation, drip drying or by forcing chilled air across the surface of the leaves.

Packaging of the finished product occurs in step 39. Various packaging techniques are possible. The preferred packaging method includes a master container holding between 5 and 50 pounds of product packaged in sub-unit containers consisting of vented plastic bags. Various combinations of vented plastic bags and cartons have proven satisfactory for this application.

In step 41, the packaged product is palletized on 48×40 inch pallets and precooled to a temperature of 45 degrees F. or less. This cooling step can be implemented using vacuum cooling techniques or by exposing the packaged product to chilled air. Hydro-precooling using chilled water or washing solution prior to drying step 37 is also effective. The packaged product is then stored at a temperature of 32–45 degrees F. until ready for use.

The invention has now been explained with reference to specific method steps. Other variations on the preferred method will be apparent to those of ordinary skill in the art in view of this disclosure. For example, the chlorine washing solution described above to clean and preserve the fresh vegetable product could be equivalently substituted by citric acid or various cleaning solutions prepared to produce the same result. Therefore it is not intended that this invention be limited, except as indicated by the appended claims.

I claim:

1. A method of processing leafy vegetables for extended shelf-life, wherein the method comprises:
    tearing the leaves from the stem while including residual stem tissue with the leaves; and
    packaging the leaves in a master container.

2. The method of processing leafy vegetables as in claim 1 further comprising the step:
    placing the torn leaves in sub-unit containers prior to packaging in the master container.

3. The method of processing leafy vegetables as in claim 1 further comprising the first step:
    harvesting the leafy vegetables from a field, wherein the harvesting further comprises the steps of selecting, cutting, and trimming the leafy vegetables.

4. The method of processing leafy vegetables as in claim 3 further comprising the step:
    transporting the leafy vegetable in a non-cored form to a processing facility under refrigeration.

5. The method of processing leafy vegetables as in claim 3 further comprising the step:
    transporting the leafy vegetable in its whole form to a processing facility at ambient temperature.

6. The method of processing leafy vegetables as in claim 1 further comprising the step:
    sorting the torn leaves into coded baskets on the basis of discriminating features of the leaves.

7. The method of processing leafy vegetables as in claim 1 further comprising the step:
    spraying the torn leaves with an aqueous chlorine solution having a chlorine concentration of between 10 and 1000 parts per million.

8. The method of processing leafy vegetables as in claim 1 further comprising the step:
    chilling the torn leaves for field storage to a temperature ranging from 32 to 52 degrees F.

9. The method of processing leafy vegetables as in claim 1 further comprising the step:
    washing the torn leaves in a wash system using an aqueous chlorine solution having a chlorine concentration of between 10 and 1000 parts per million.

10. The method of processing leafy vegetables as in claim 9 further comprising the step:
    drying the torn leaves.

11. The method of processing leafy vegetables as in claim 1 further comprising the step:
    holding and transporting the torn leaves under cooled conditions.

12. The method of processing leafy vegetables as in claim 11 further comprising the step:
    maintaining the torn leaves in a cooled condition during the holding and transporting within a temperature range of 32 to 52 degrees F.

13. The method of processing leafy vegetables as in claim 1 further comprising the step:
    submerging the torn leaves in an aqueous chlorine solution having a chlorine concentration of between 10 and 1000 parts per million, in order to remove insects, dirt and other debris.

14. The method of processing leafy vegatables as in claim 13, wherein following the step of submerging the torn leaves, processing further comprises the step of:
    drying the torn leaves.

15. The method of processing leafy vegetables as in claim 13 further comprising the step:
    agitating the submerged torn leaves to further effect the washing process.

16. The method of processing leafy vegetables as in claim 1 further comprising the step:
    cooling the torn leaves to a temperature of 32–45 degrees F.

17. The method of processing leafy vegetables as in claim 16 wherein the cooling is achieved using vacuum cooling.

18. The method of processing leafy vegatables as in claim 16 wherein the cooling is achieved using chilled air.

19. The method of processing leafy vegetables as in claim 16 wherein the cooling is achieved using hydro-cooling.

20. The method of processing leafy vegetables as in claim 16 wherein the cooling is achieved using ice.

* * * * *